United States Patent
Miller et al.

[11] Patent Number: 5,899,655
[45] Date of Patent: May 4, 1999

[54] VEHICLE TRANSPORTING DEVICE

[76] Inventors: Bob C. Miller; Jeffrey B. Miller, both of 8601 SE. Bristol Way, Jupiter, Fla. 33458

[21] Appl. No.: 08/884,311

[22] Filed: Jun. 27, 1997

[51] Int. Cl.⁶ ..................................................... B60P 9/00
[52] U.S. Cl. ......................... 414/462; 414/537; 224/924; 224/510
[58] Field of Search ................... 414/462, 537, 414/538; 224/510, 924

[56] References Cited

U.S. PATENT DOCUMENTS

| | | |
|---|---|---|
| 2,305,762 | 12/1942 | Cristofoletti et al. .................. 414/538 |
| 3,348,713 | 10/1967 | Will . |
| 3,528,578 | 9/1970 | Schoenberger . |
| 3,779,406 | 12/1973 | Hermann ................................. 414/537 |
| 3,843,001 | 10/1974 | Willis . |
| 3,912,098 | 10/1975 | Nicotra . |
| 3,921,842 | 11/1975 | Campbell . |
| 4,189,274 | 2/1980 | Shaffer . |
| 4,275,981 | 6/1981 | Bruhn . |
| 4,906,041 | 3/1990 | McKenzie ............................... 414/537 |
| 4,932,829 | 6/1990 | Miller ...................................... 414/462 |
| 5,108,248 | 4/1992 | Murrill ..................................... 414/462 |
| 5,228,712 | 7/1993 | Speier ..................................... 414/537 |
| 5,234,307 | 8/1993 | Scott ....................................... 414/537 |
| 5,249,910 | 10/1993 | Ball ........................................ 414/462 |
| 5,253,973 | 10/1993 | Fretwell . |
| 5,281,075 | 1/1994 | Tatman et al. .......................... 414/537 |
| 5,380,141 | 1/1995 | Flowers .................................. 414/462 |
| 5,456,564 | 10/1995 | Bianchini . |
| 5,462,398 | 10/1995 | Hymer . |
| 5,511,928 | 4/1996 | Ellis ........................................ 414/462 |
| 5,603,600 | 2/1997 | Egan et al. .............................. 414/462 |
| 5,647,719 | 7/1997 | Bowlen .................................. 414/462 |
| 5,730,577 | 3/1998 | Jones ...................................... 414/462 |

*Primary Examiner*—Karen M. Young
*Assistant Examiner*—Douglas Hess
*Attorney, Agent, or Firm*—McHale & Slavin, P. A.

[57] ABSTRACT

An apparatus for loading a motorcycle or a secondary vehicle onto a carrier so that the carrier can be secured to a primary self-propelled vehicle for transporting. The carrier employs a docking unit which can be lowered to ground level allowing for ease of loading a motorcycle thereon. The docking unit may then be retracted by a pivoting conveyor assembly that guides the docking across roller supports to a raised position. The conveyor assembly rests upon a series of nested sleeves that allow the conveyor assembly to pivot to an inclined, loading/unloading orientation to the horizontal, transporting orientation. Elastomeric suspension elements dampen shock loads transferred to the device during travel. The device includes mounting shafts for securement either to a receiver hitch or a trailer. A system of interlocking pieces restricts relative motion of the device during travel. Tie downs and wheel chocks further assist in control of a vehicle during loading and transporting.

22 Claims, 8 Drawing Sheets

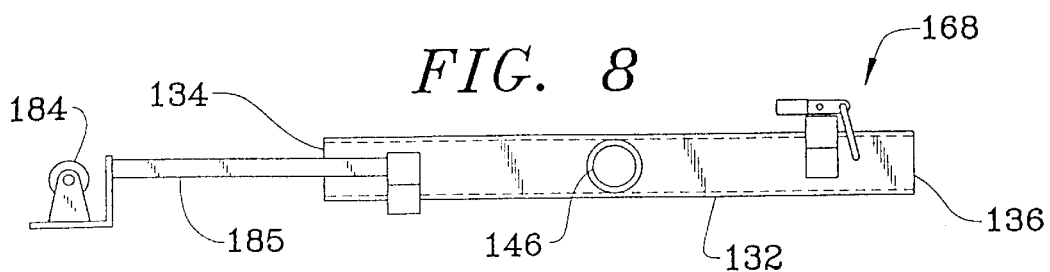
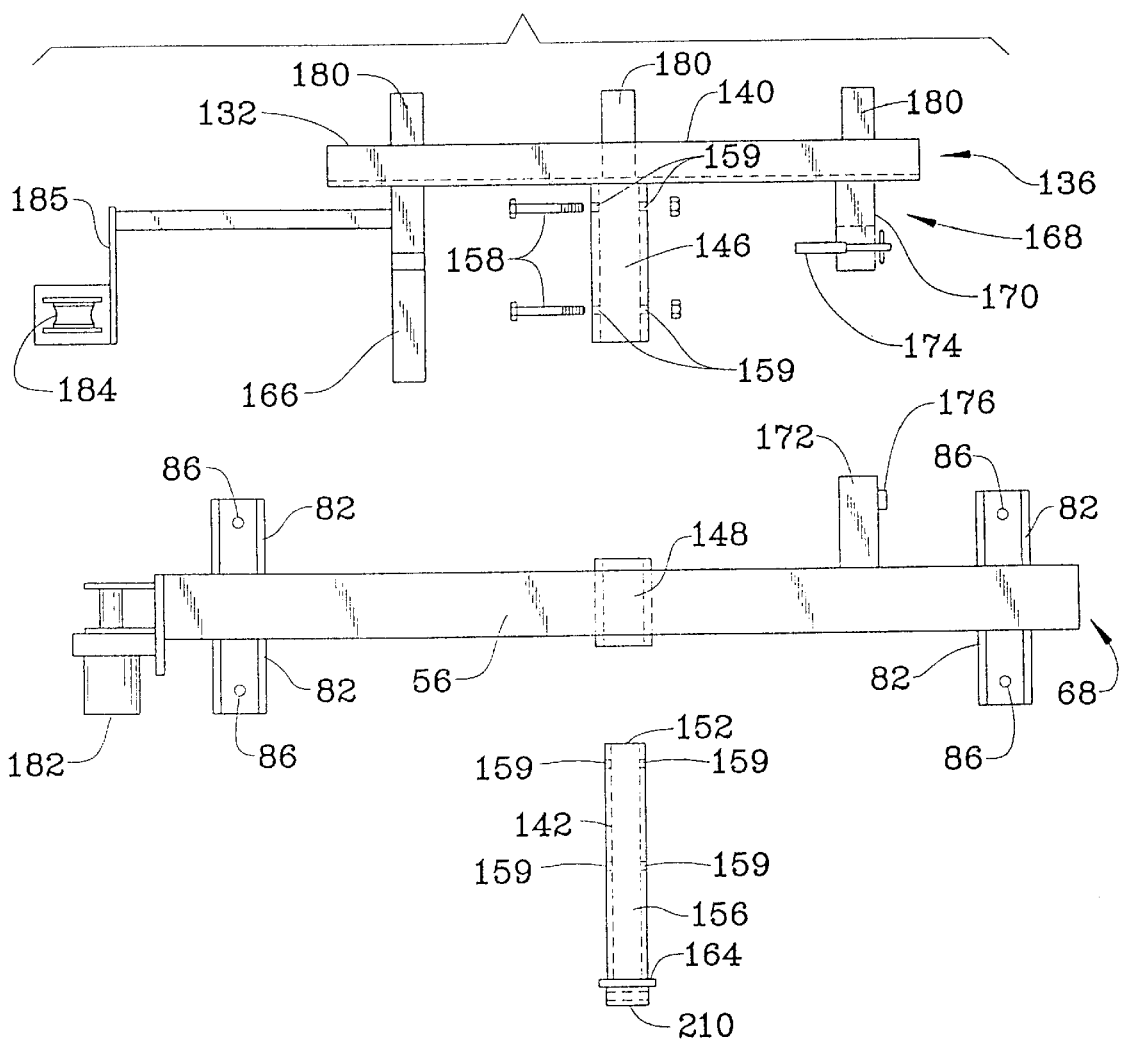
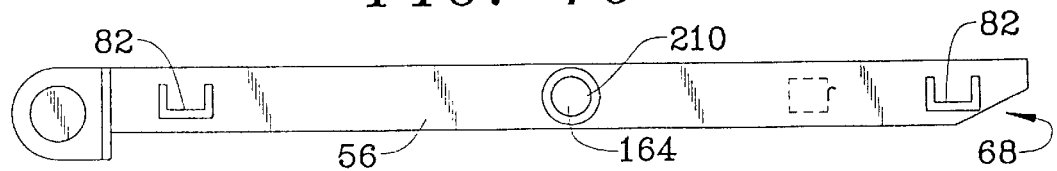

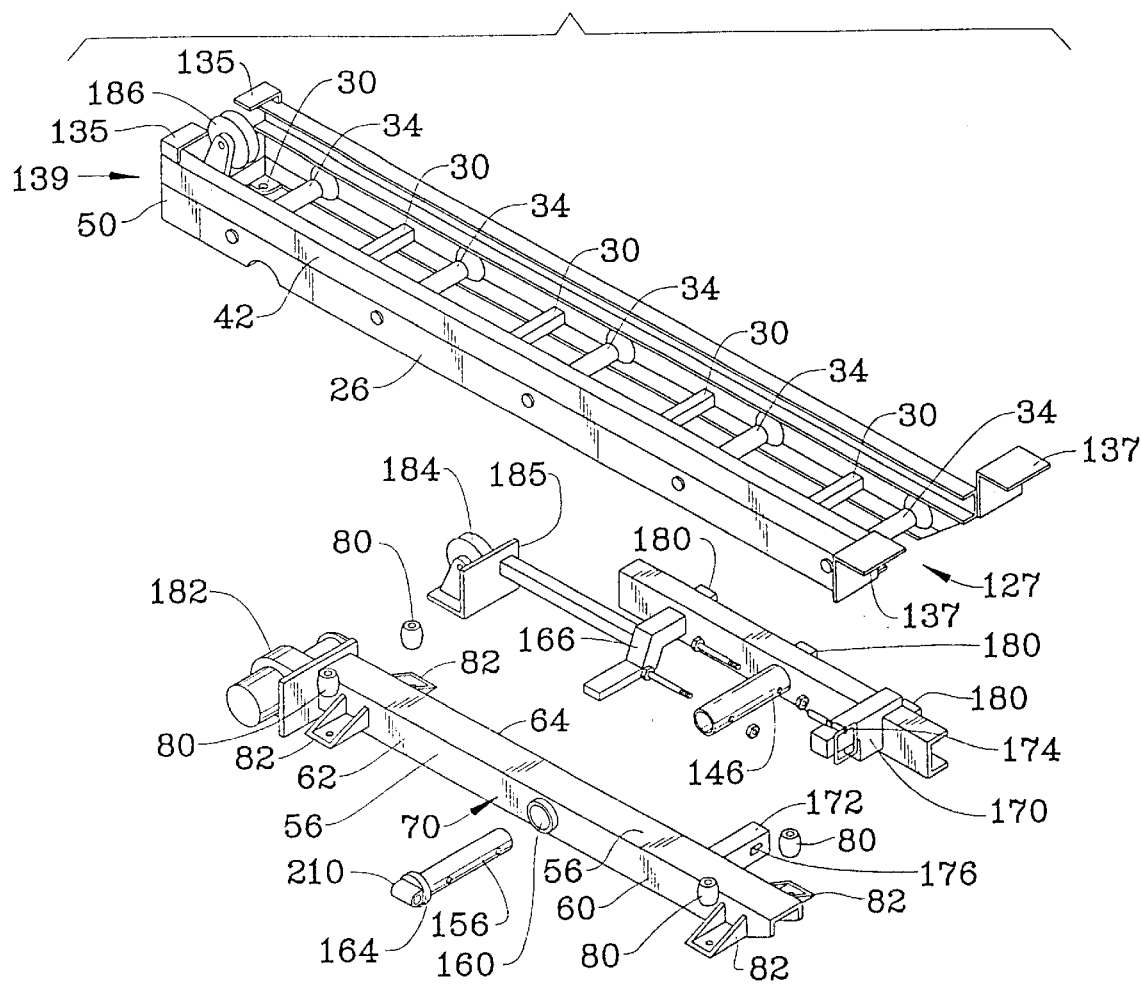
FIG. 11
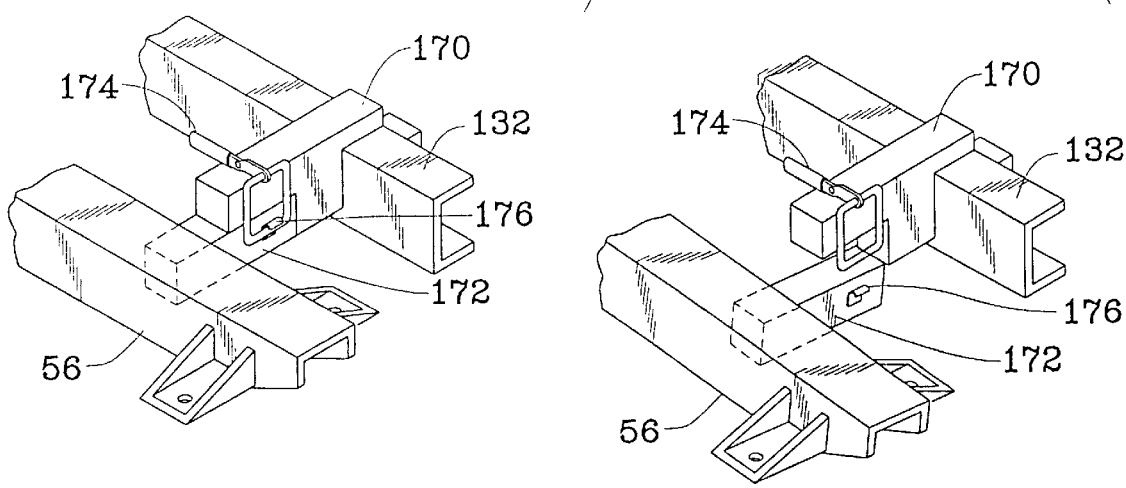
FIG. 12
FIG. 13

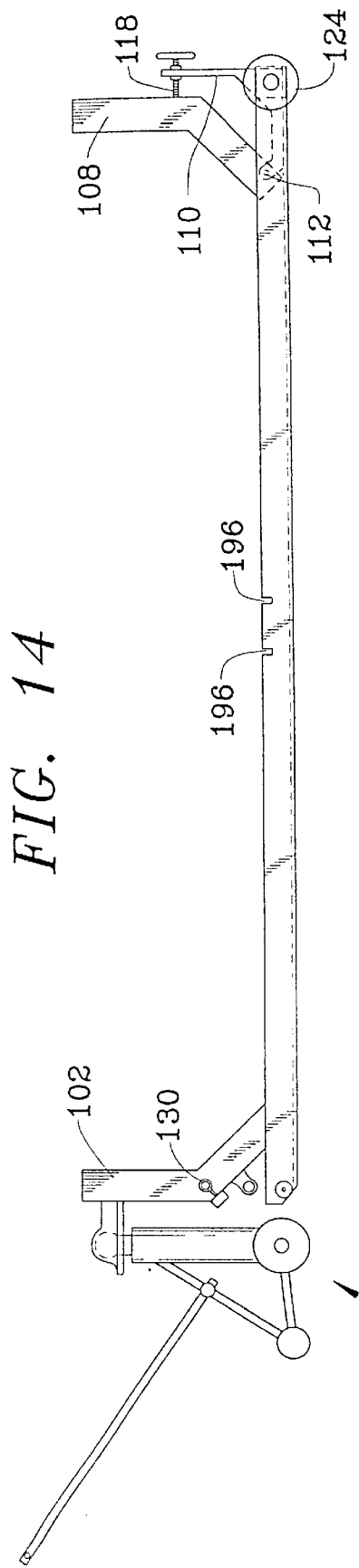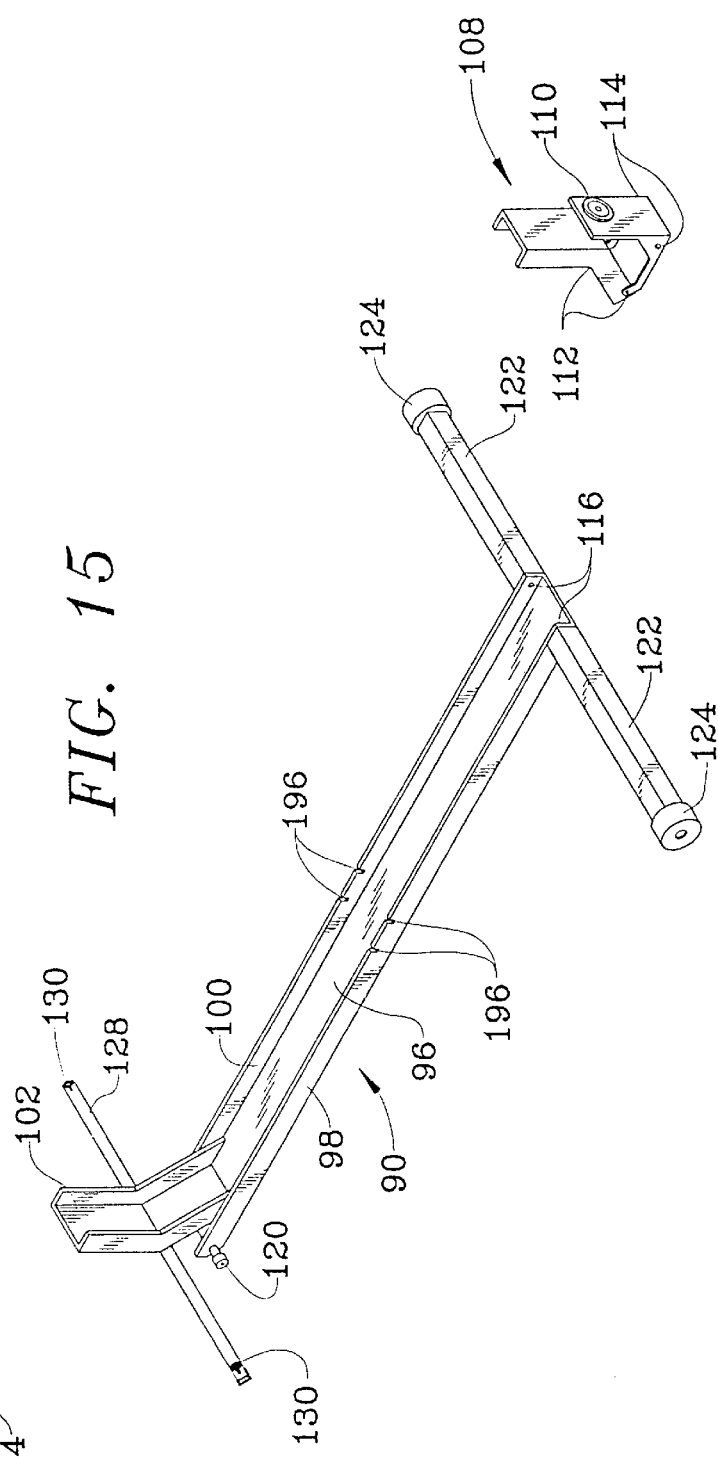
FIG. 14
FIG. 15

VEHICLE TRANSPORTING DEVICE

FIELD OF THE INVENTION

This invention relates to vehicle carriers and more particularly to a vehicle carrier that eases loading and securement of a secondary vehicle to a vehicle trailer hitch or to an independent trailer.

BACKGROUND OF THE INVENTION

The ability to transport a secondary vehicle, such as a motorcycle, moped, electric wheelchair, A.T.V. or the like is well known. A carrier allows a secondary vehicle, such as motorcycle, to be carried from one location to another without operating the motorcycle. This is especially important if the vehicle is not street legal, as in the case of off-road dirt bikes. In many instances the transported vehicle may be safe only for local use and could be dangerous if driven on highways. In other instances the transported vehicle may be too valuable for highway use where such a vehicle is subject to an accelerated wear. In any event, the ability to transport a secondary vehicle will greatly enhance the longevity of the vehicle and provides efficiency when coupled to an automobile, truck, van, or recreational vehicle or other motorized vehicle.

A variety of carriers exist, each attempting to deal with the difficulties of securing a secondary vehicle. Many individuals choose to have the carrier coupled directly to the primary vehicle by use of a trailer or bumper hitch. In this manner a carrier may be coupled transversely to the length of the automobile wherein the automobile supports the entire weight of the carrier and secondary vehicle. Alternatively the carrier may be coupled to the automobile by use of a trailer wherein the automobile secures only a portion of the weight with the trailer wheels supporting the remaining weight of the secondary vehicle.

Regardless of the type of carrier, one of the most troublesome issues faced by the use of a carrier is the substantial weight and space requirements inherent in most secondary vehicles, even relatively-small motorcycles or mopeds.

To load the known ramp-type carriers, an individual must push, drive, or roll a vehicle upward, to an elevated position, and hold the vehicle upright until it is secured. This approach requires enormous amounts of dexterity and, depending on the type of secondary vehicle being loaded, is potentially dangerous. For example, loading a motorcycle on this type of carrier requires an individual not only to propel a top-heavy vehicle up an incline, it also requires the individual to prevent the motorcycle from rolling back down the ramp and ensure that the motorcycle does not topple sideways, off the ramp, until loading is complete. To be loaded correctly, known ramp carriers often require two people. When only one person is available, undue strain often causes back muscle damage. Although, compared to early lift-on carriers, known ramp-type carriers help reduce the amount of vertical lifting required to load a vehicle, they require inordinate amounts of dexterity. The following are exemplary of such ramp-type carriers.

U.S. Pat. No. 3,348,713 discloses a motorcycle carrier with a central pivot wherein the motorcycle is pushed or driven onto the carrier and the carrier pivoted and locked in position.

U.S. Pat. No. 3,528,578 discloses a motorcycle carrier that employs a pinion mounted to the frame of a vehicle wherein the carrier is placed in a lowered position and by use of the automobile jack is lifted into an upright position and then locked in place.

U.S. Pat. No. 3,720,333 discloses a motorcycle carrier with a removable ramp allowing a motorcycle to be driven on to the carrier for proper positioning.

U.S. Pat. No. 3,843,001 discloses a motorcycle carrier having a slidable ramp that allows the carrier to be placed adjacent to a vehicle wherein a motorcycle is driven onto or pushed onto the ramp secured in position; the ramp is then lifted and slid into a position transverse to the automobile.

U.S. Pat. No. 3,912,098 discloses a carrier having a detachable ramp allowing a motorcycle to be driven onto the ramp for securement thereto.

U.S. Pat. No. 3,921,842 discloses a motorcycle carrier attachment consisting of a carrier that is pivotally mounted onto the back of a vehicle with an extendable ramp. The ramp allows the vehicle to be driven onto the carrier and then operates as a wheel block sidewall so as to prevent movement of the vehicle.

U.S. Pat. No. 4,275,981 discloses a vehicle-mounted motorcycle carrier which is pivotal along one portion of the carrier. An extension ramp is utilized wherein a motorcycle can be pushed or driven onto the carrier. When the motorcycle is over-center it will cause the carrier to rotate into a horizontal position. The ramp may then be slid beneath the carrier surface for transporting purposes.

U.S. Pat. No. 4,189,274 discloses a motorcycle carrier having a bracket that clamps onto a bumper. The carrier surface includes an over-center pivot allowing a motorcycle to be pushed or driven onto the carrier. The carrier moves along a pivot point having independent rollers so as to cause the carrier to move from an outside portion of the vehicle to a transportable position.

U.S. Pat. No. 5,253,973 discloses a vehicle lift which consists of a carrier coupled to the frame of a vehicle. A hydraulic piston causes movement of the lift from a lowered position for ease of access to a raised position for carrying of items.

U.S. Pat. No. 5,462,398 discloses another motorcycle carrier that is pivotal along a central position. The carrier is coupled to a trailer hitch with a wheel stop operating as an entrance ramp. Once the motorcycle has been driven over the center portion of the carrier, the carrier will rotate back into a horizontal position allowing for securement and transportation thereof.

U.S. Pat. No. 5,456,564 discloses a motorcycle lift with a platform secured at the end of pinned arms. A winch and cable pivots the arms, lifting the platform vertically into a locked position.

Numerous other carriers are also known in the art including Pat. Nos. 3,207,396; 3,567,052; 3,529,737; 3,760,965; 4,046,297; 4,191,316; 4,464,952; 4,601,632; 5,366,338.

All of the prior art devices, except U.S. Pat. No. 5,456,564, require the motorcycle to be driven onto the ramp or pushed onto it which can present a most dangerous condition for the operator. In many instances should an individual attempt to drive up a ramp it is possible for the motorcycle to overdrive the ramp, miss the ramp with one or both wheels, or simply fall off the motorcycle as it is moving too slow for an individual to correctly balance such a vehicle. This is especially prevalent in larger vehicles that are heavy and have a high mass of weight above the ground making them extremely easy to tip over. In addition, as the prior art all teaches ramps that are pivotal when a motorcycle is on the ramp unless the motorcycle has been secured during the pivot the motorcycle can easily become disengaged from the carrier causing the motorcycle to fall over and possibly injuring the operator. Patent '564 has shortcomings as well. The frame which supports the platform of that device interferes with vehicle dismount during loading. Also, the '564 patent depends on only one cable to lift and support the full weight of the vehicle motorcycle during loading. Failure of the cable, which is subject to fatigue loading, would drop and likely damage, the motorcycle.

Thus what is lacking in the art is secondary vehicle carrier which allows an individual to load the vehicle horizontally at ground level having provisions for pulling the vehicle and carrier up an incline ramp wherein the ramp is then rotated into a horizontal position for transportation.

SUMMARY OF THE INVENTION

The instant invention is a carrier for motorcycles, mopeds, wheelchairs, all terrain vehicles, and similar secondary vehicles. The carrier attaches to a primary vehicle, such as an automobile, by use of a mounting structure that couples to a trailer hitch, a bumper hitch, or can be mounted on a trailer which is then towed by the primary vehicle.

The carrier incorporates a conveyer assembly pivotally secured to the mounting structure. The conveyor assembly is movable from a horizontal transporting position to an inclined position wherein a docking unit is allowed to slide along the conveyer assembly for ease of loading the secondary vehicle. The docking unit is placed on the ground wherein the secondary vehicle may be driven onto the docking unit or pushed thereon at ground level. The ability to maneuver a secondary vehicle at ground level provides operator safety during the loading and unloading procedure.

A secondary vehicle, such as a motorcycle weighing over a 1000 pounds, can be safely driven onto the docking unit. The operator can maintain contact with the ground in order to stabilize the motorcycle during the slow speed maneuver. Once the motorcycle has been driven onto the docking unit it can be securely fastened to the docking unit by use of tie downs and wheel blocks. The conveyor system utilizes a winch to retract the docking unit along the inclined angle of the conveyer assembly. This winch operation can be performed with the operator standing away from the motorcycle thereby eliminating the operators need to drive or push the vehicle up an incline as taught by the prior art.

The winch retracts the docking unit by use of a flexible cable which pulls the docking unit up an inclined ramp having rollers on the front end of the docking unit, providing alignment with roller wheels placed at the rear portion of the docking unit to prevent the docking unit from dragging along the ground when the weight of the motorcycle is placed thereon. As the vehicle is moved onto the conveyor assembly, the assembly is returned to a horizontal position where it is securely locked so as to inhibit further movement.

The docking unit has a fixed front wheel stop and a removable rear wheel stop that allows for placement of the motorcycle onto the docking unit without interference. The rear wheel stop is adjustable to accommodate various sized secondary vehicle wheels. Tiedown points at the front and rear of the docking unit are provided to stabilize the secondary vehicle during loading. The lower support member includes elastomeric suspension elements to provide road shock absorption and assist in ramp alignment during loading in the event the docking unit is not initially parallel to the conveyer assembly.

The pivotal structure allows for the rotation of the conveyer assembly before the front wheel approximates the mid point of the docking unit, causing the conveyer assembly to rotate in a parallel relation to the conveyer assembly. The lifting of the conveyor assembly transfers the vehicle load from the front rollers to the bottom of the docking unit. Once the docking unit is in position, a latching mechanism engages notches in the docking unit to restrict side to side and front to back movement of the docking unit. Load-stabilizing tie downs are also employed to accommodate the vehicle acceleration and deceleration and to prevent movement of secondary vehicle.

Unloading of a secondary vehicle requires removal of the load stabilizing tiedowns and latching mechanism. The winch may then be operated so as to cause the conveyor assembly to pivot into an inclined position. This allows the rear stabilizing wheels of the docking unit to engage the ground and allows the unit to slide outward on the conveyor assembly rollers. The docking unit front wheels allow the docking unit to continue to slide down the inclined conveyor assembly until the docking unit is resting level, on the ground. The loading tiedowns that secure the secondary vehicle to the carrier and the rear wheel stop may then be removed and the secondary vehicle removed from the docking unit.

Thus an object of the instant invention is to teach a carrier that allows a secondary vehicle to be loaded at ground level.

Still another object of the instant invention is to teach a carrier for secondary vehicles that allows an individual to secure the secondary vehicle at ground level before it is raised into a transporting position.

Another objective of the invention is to provide a loading platform that is stable even when not steadied by contact with the ground.

Still another objective of the instant invention is to teach a secondary vehicle carrier that may be secured to the trailer hitch of a primary automobile or mounted on a trailer which is then coupled to a trailer hitch of a primary vehicle.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 8 is a side view of the pivot assembly of the present invention;

FIG. 9 is an overhead exploded view of the pivot means of the present invention;

FIG. 10 is a side view of the conveyor assembly support beam of the present invention;

FIG. 11 is an exploded perspective view of the present invention;

FIG. 12 is a perspective view shown in detail of a second support arm;

FIG. 13 shows the components of the second support arm of the present invention and a separated or breakaway position;

FIG. 14 is a side view of the docking unit of the present invention;

FIG. 15 is a perspective view of the docking unit of the present invention;

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
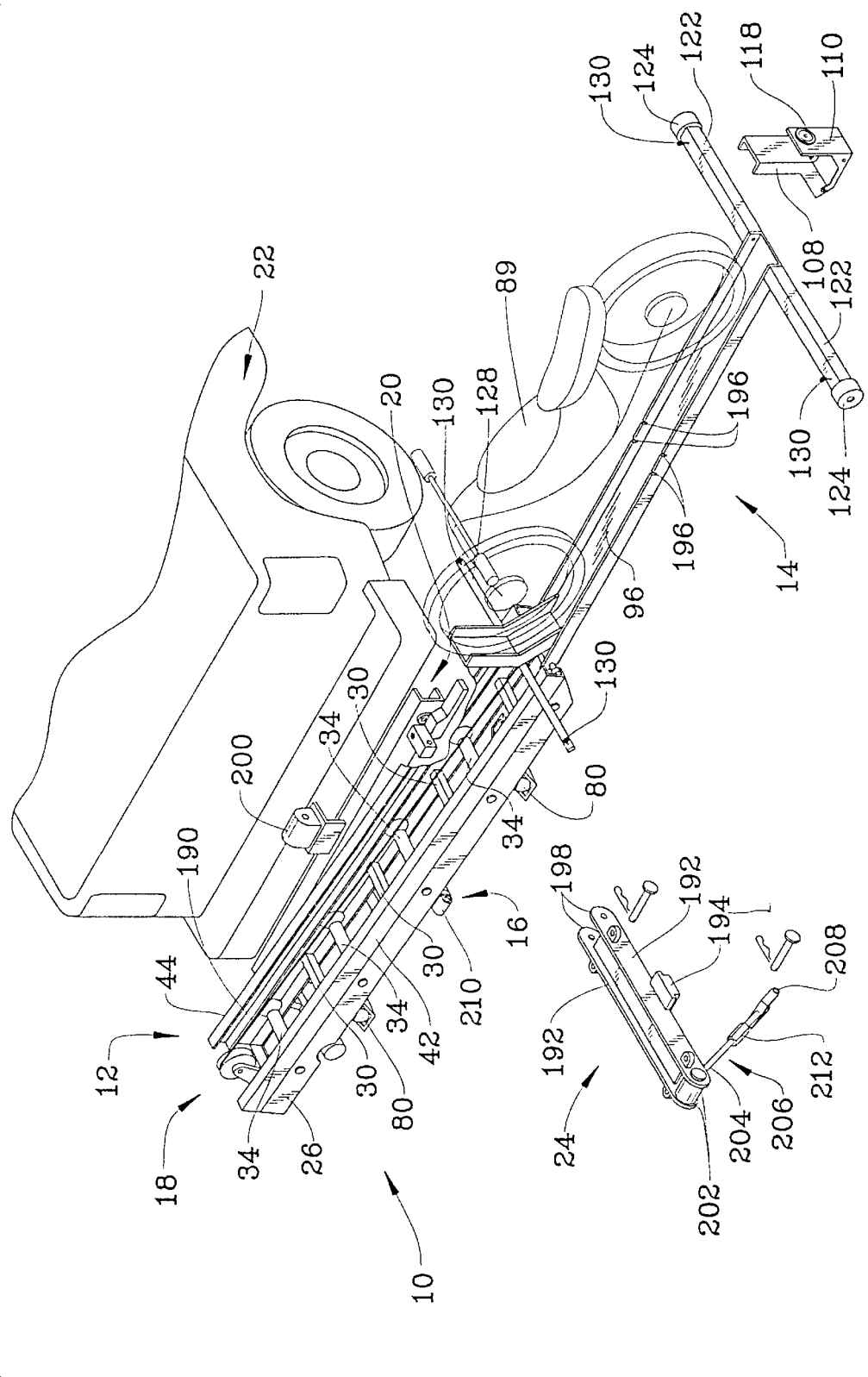
FIG. 1 is a pictorial view showing the present invention attached to the trailer hitch of a transporting vehicle.

Reference is now made to FIG. 1, wherein an vehicle transporting device 10 according to the present invention is shown. The device 10 comprises a tilting conveyor assembly 12, a docking unit 14 in telescoping relation with the conveyor assembly 12, and a pivot means 16 which allows the conveyor assembly to tilt. A locomotion means 18 controls the tilting of the conveyor assembly 12 and also slides the docking unit 14 with respect to the conveyor assembly. The device 10 also includes a mounting means 20 which allows easy connection to a transporting vehicle 22. The device 10 also includes a locking means 24 for maintaining the conveyor assembly 12 and docking unit 14 in a fixed orientation during travel.

Figure 2:
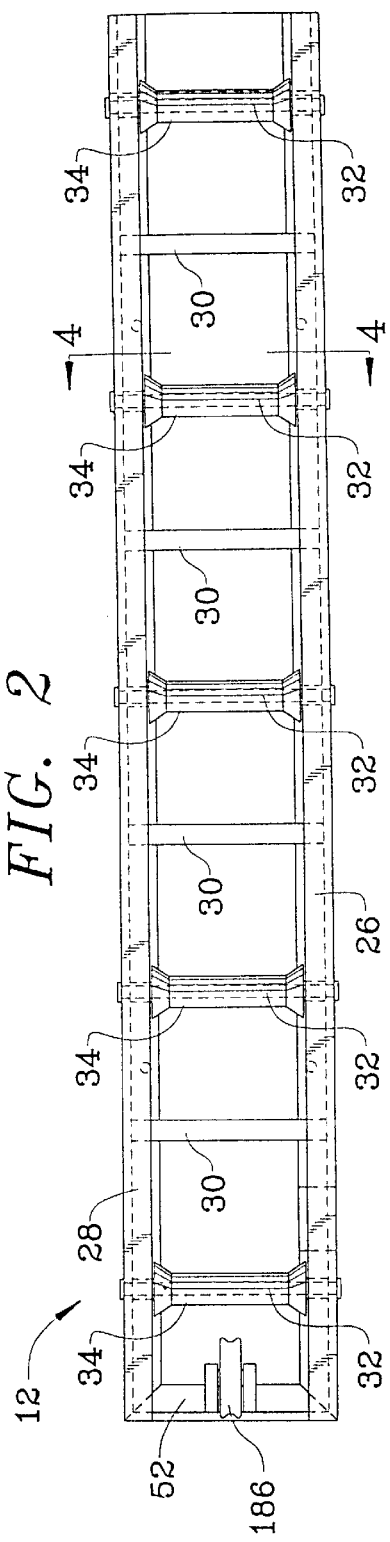
FIG. 2 is an overhead view of the conveyor assembly of the present invention.
Figure 3:
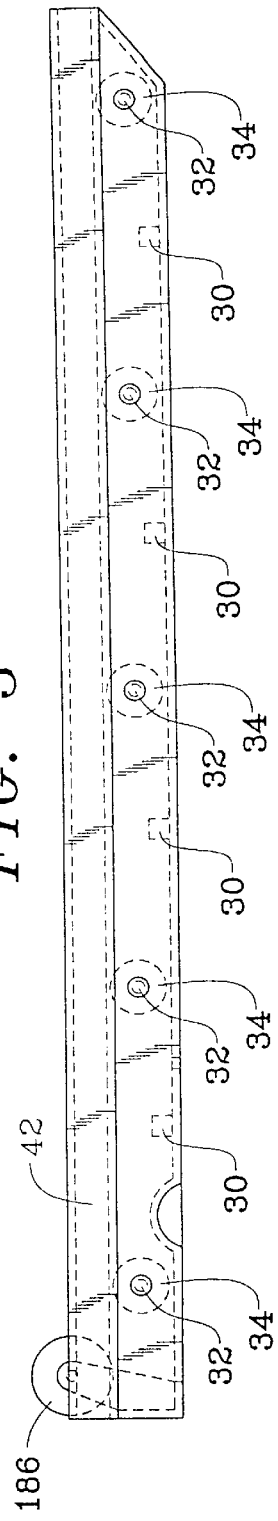
FIG. 3 is a side view of the conveyor assembly of the present invention.

As shown in FIG. 2, the conveyor assembly 12 resembles a ladder which is capable of tilting from an inclined orientation to a horizontal orientation. The assembly 12 includes a first elongated, L-sectioned beam 26 spaced apart from a second elongated, L-sectioned beam 28 by beam braces 30. The first and second L-sectioned beams 26,28 are parallel, and the beam braces 30 extend orthogonally therebetween. Center shafts 32 also extend orthogonally between the L-sectioned beams 26,28. A docking unit support roller 34 is rotatably mounted on each center shaft 32. As shown in FIG. 3, each center shaft 32 includes a first end 36 and a second end 38. A spacer 40 is included at the ends 36, 38 of each center shaft. The spacers ensure that the support rollers 34 remain centered between the parallel L-sectioned beams 26,28.

Figure 4:
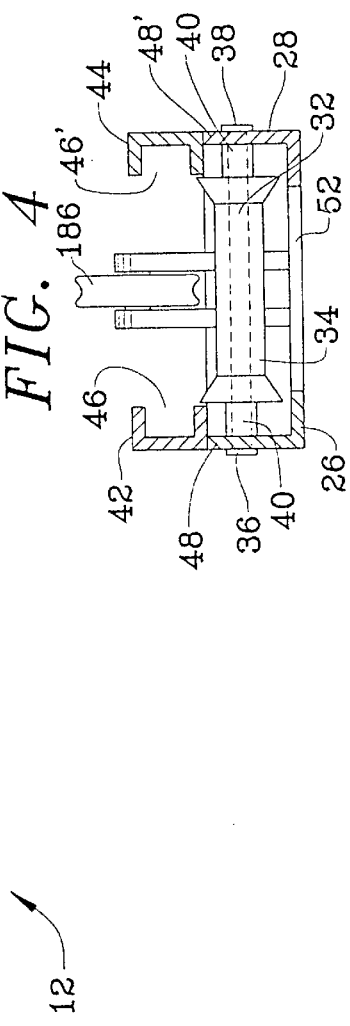
FIG. 4 is a cross-section view of the conveyor assembly of the present invention, taken along line 4—4 in FIG. 2.

As shown generally in FIGS. 2, 3, and 4, the conveyor assembly 12 also includes a first docking unit guide 42 and a second docking unit guide 44. The docking unit guides 42,44 are a pair of elongated, C-sectioned channels oriented so that their open portions 46,46' are oriented to face each other. As shown in FIG. 3, each L-sectioned beam includes an upper edge 48,48'. Each of the docking unit guides 42,44 is disposed on one of the L-sectioned beam upper edges 48,48'. More specifically, the underside of the first docking unit guide 42 is disposed along the first L-sectioned beam upper edge 48; the underside of the second docking unit guide 44 is disposed along the second L-sectioned beam upper edge 48'. The L-sectioned beams 26,28 are further identified by corresponding first ends 50,50', between which a pulley mounting beam 52 extends, and second ends 54,54'. The L-sectioned second ends 54,54' are shaped to allow the conveyor assembly 12 to tilt as needed during loading, described below.

Figure 5:
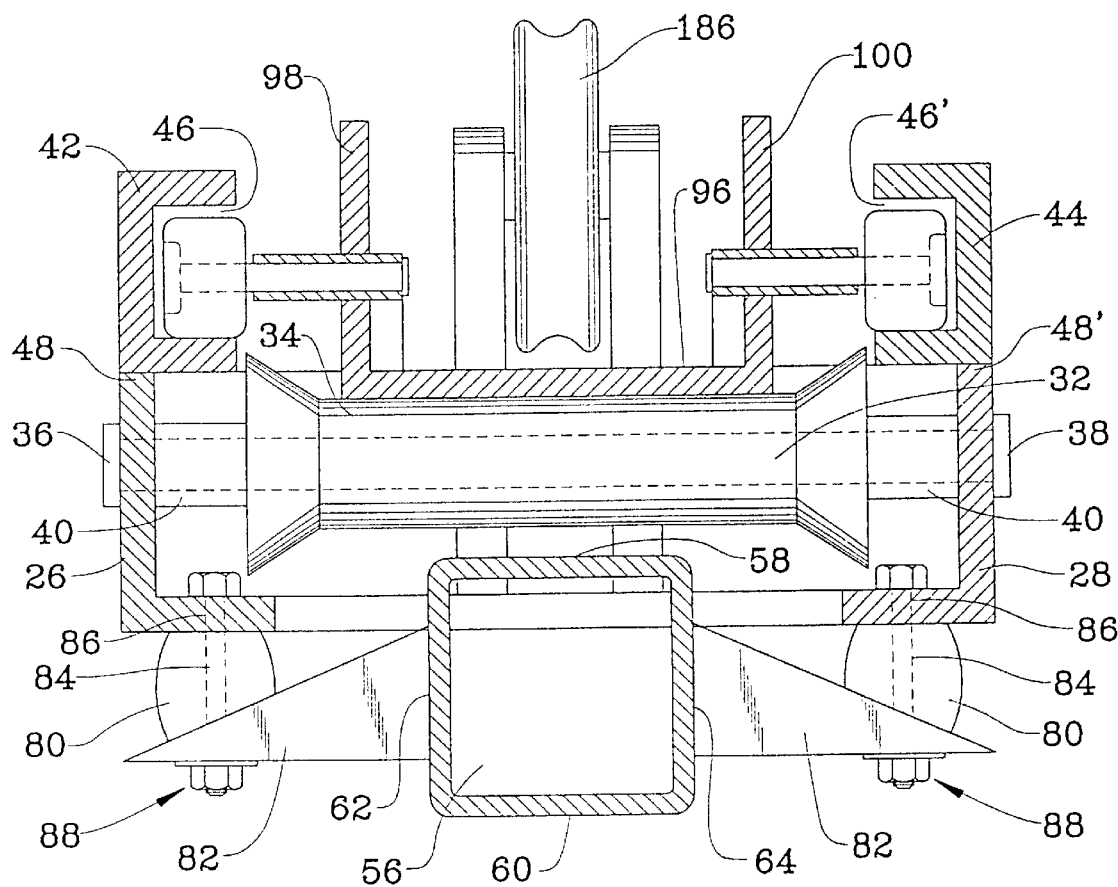
FIG. 5 is an expanded cross-section view of the conveyor assembly of the present invention.

As shown in FIGS. 5, 10 and 11, the conveyor assembly also includes a conveyor assembly support beam 56. The conveyor assembly support beam 56 is essentially a hollow, rectangular tube with a top surface 58, a bottom surface 60, a first side surface 62, and a second side surface 64. The beam 52 is further characterized by a first end 66 and a second end 68. The first and second ends 66,68 are spaced apart by an integral middle portion 70.

As shown in FIGS. 5 and 11, four elastomeric cylinders 80 connect the conveyor assembly 12 to the conveyor assembly support beam 56; these cylinders 80 absorb shock and allow controlled relative motion between the conveyor assembly 12 and support beam 56. The elastomeric cylinders 80 rest on damping element mounts 82 that extend outward from the side surfaces 62, 64 of the conveyor assembly support beam 56. Each damping element mount 82 supports one of the hollow elastomeric cylinders 80. Two mounts 82 are located at each end 66, 68 of the conveyor assembly support beam 56; that is, one pair of mounts 82 extends from each side surface 62, 64.

Essentially, the elastomeric cylinders 80 are rigid, resiliently-compressible columns mounted on connection bolts 84 that extend between the conveyor assembly support beam 56 and the L-sectioned beams 26, 28. As shown in FIG. 5, the connection bolts 84 extend downward from bolt apertures 86 in the L-sectioned beams 26, 28. Each connection bolt 84 extends through one of the elastomeric cylinders 80, passing through the floor of a corresponding damping element mount 82. A washer-and-nut fastening arrangement 88 keeps each connection bolt aligned properly. The elastomeric cylinders 80 advantageously absorb much of the shock that would otherwise be transferred to a transported vehicle during travel.

Referring to FIGS. 1, 14 and 15, the device also includes a docking unit 14 onto which a vehicle 89 is placed and secured. Although in the present embodiment, the docking unit is designed to accept and secure a motorcycle, the docking unit may be also be shaped to secure other types of vehicles. The docking unit 14 is essentially an elongated, U-sectioned channel 90 that is adapted to secure a motorcycle, holding it upright. The U-sectioned channel 90 has a first end 92 spaced apart from a second end 94 by a support floor 96. The support floor 96 is bounded by a first upstanding sidewall 98 and an opposite, second upstanding sidewall 100.

A first vehicle wheel stop 102 is attached to the U-sectioned channel 90, near the channel first end 92. The first vehicle wheel stop 102 is a length of U-sectioned track that is angled to engage the front wheel 104 of a motorcycle 89 rolled into the U-sectioned channel 90.

The motorcycle rear wheel 106 is held in place by a second vehicle wheel stop 108 that is inserted into the second end 94 of the U-sectioned channel. The second vehicle wheel stop 108 acts as a type of chock, preventing rearward rolling of the motorcycle 89. Similar to the first vehicle wheel stop 102, the second vehicle wheel stop 108 is a length of U-sectioned track angled to engage the back wheel 106 of a motorcycle. However, the second vehicle wheel stop 108 is removable and includes an L-shaped securing bracket 110 which locks the second wheel stop 108 within the U-sectioned channel. The securing bracket 110 is attached to the second wheel stop 108 by a pair of link pins.

Spring-loaded locking bolts 114 extend outward from the securing bracket 110 and engage locking bores 116 disposed within the upstanding sidewalls 98,100 of the U-sectioned channel, near the channel second end 94. A threaded positioning bolt 118 extends through the securing bracket 110, and one end of the bolt 118 rests against the second wheel stop 108. Since the securing bracket 110 is pinned to the second wheel stop 108, rotation of the positioning bolt 118 produces relative motion between the bracket and second wheel stop. By increasing distance between the second wheel stop 108 and the securing bracket 110, the second wheel stop becomes braced against the rear wheel 106 of a motorcycle 89 placed within the U-sectioned channel 90, effectively preventing rolling of the motorcycle along the support floor 96.

The docking unit 14 is designed to translate within the conveyor assembly 12. The docking unit 14 slides across the support rollers 34, directed by the docking unit guides 42,44. To ease entry of the docking unit into the conveyor assembly 12, a pair of travel rollers 120 is disposed on the first end 92 of the U-sectioned channel, one roller 120 on each sidewall 98, 100. The docking unit second end 94 includes a pair of stabilizing arms 122 that extend orthogonally from the U-sectioned channel, one arm from each upstanding sidewall 98,100. A second end wheel 124 is disposed on the distal end of each stabilizing arm 122. The channel first end 92 has an angled front face 126 sloped to align with the conveyor assembly second end 127 when the U-sectioned channel enters the conveyor assembly. The conveyor assembly second end 127 includes tapered bumpers 129,131 that ensure proper alignment of the docking unit 14 within the conveyor assembly 12 during loading and unloading; a total of four bumpers are used. One horizontal alignment bumper 129 is located in each L-sectioned beam 26,28, near the second end 54,54'. One vertical alignment bumper 131 is located on top of each docking unit guide second end 133,133'. The horizontal bumpers 129 help align the U-sectioned channel sidewalls 98,100 parallel with the L-sectioned beams 26,28. The vertical bumpers 131 work to ensure proper seating of the docking unit 14 onto the support rollers 34, as the conveyor assembly second end 127 pivots upward during loading. The conveyor assembly 12 also includes front docking unit retainers 135 and rear docking unit retainers 137 that prevent the docking unit first end 92 from traveling past the conveyor assembly first end 139.

Figure 6:
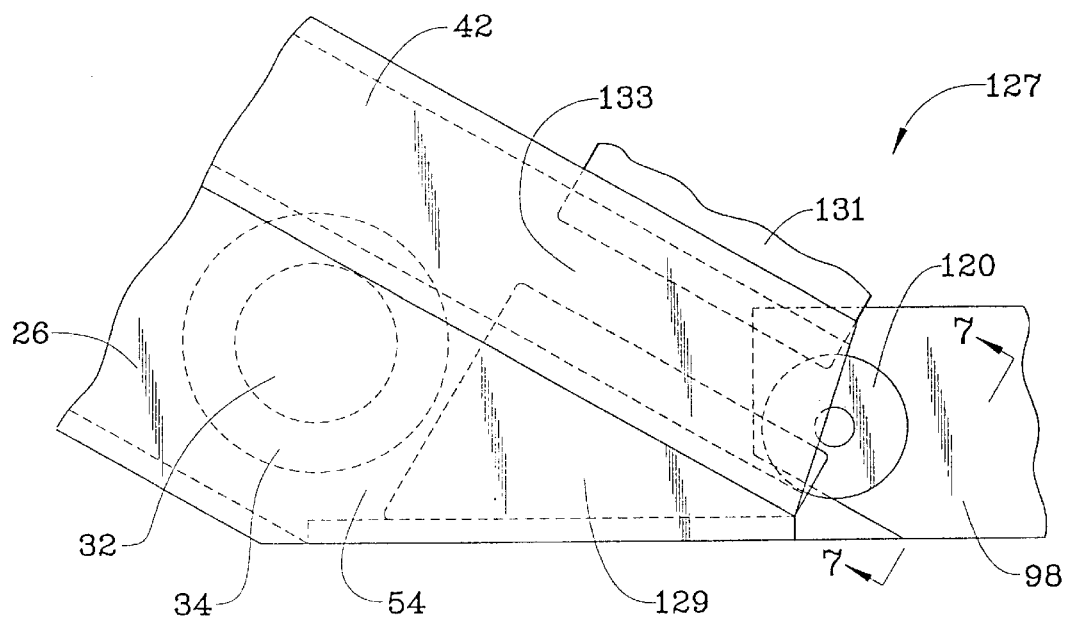
FIG. 6 is a partial side view of the present invention, showing the docking unit entering the conveyor assembly.
Figure 7:
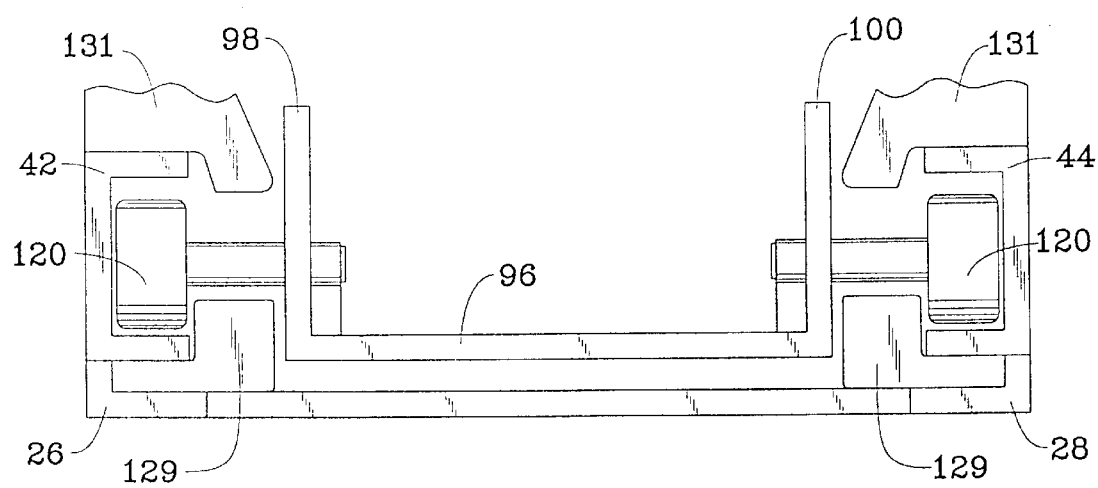
FIG. 7 is a partial end view showing detail of the conveyor assembly of the present invention.

With reference to FIGS. 6 and 7, the conveyor assembly second end 127 includes tapered bumpers 129, 131 that endure proper alignment of the docking unit 14 within the conveyor assembly 12, during loading and unloading. A total of four bumpers 129,131 are used. One horizontal alignment bumper 129 is located in each L-sectioned beam 26,28, near the second end 54,54'. One vertical alignment bumper 131 is located on the top of each docking unit guide second end 133,133'.

The horizontal bumpers 129 help align the U-sectioned channel sidewalls 98,100 parallel with the L-sectioned beams 26,28. The vertical bumpers 131 ensure proper seating of the docking unit 14 on to the support rollers 34, as the conveyor assembly second end 127 pivots upward during loading.

The docking unit 14 includes features to support a motorcycle 89 upright within the U-sectioned channel 90. The docking unit 14 includes a tie down bar 128 attached to the first vehicle wheel stop 102. Each end of the tiedown bar 128 includes a tiedown eyelet 130. The distal end of each stabilizing arm 122 includes a similar tiedown eyelet 130. The eyelets 130 act as connection points for support cables (not shown) spanning between the docking unit 14 and a motorcycle 89 placed therein.

In keeping with the objects of this invention, the device includes a pivot means 16 that allows the conveyor assembly 12 to tilt through a range of positions, varying from horizontal to approximately fifty degrees from horizontal. As shown in FIGS. 9–11, the conveyor assembly support beam 12 is connected to a main support beam 132 by a series of cooperating pieces. The main support beam 132 is a C-sectioned beam having a first end 134 and a second end 136 separated by a wall having a first side surface 138 and an opposite, second side surface 140. A low-friction, metallic bushing shaft 142 extends orthogonally from the main support beam first side surface 138. The bushing shaft 142 is, in turn, surrounded by a two-part outer sleeve 144. The outer sleeve is comprised of a pair of abutting sleeves, referred to as the first outer sleeve 146 and the second outer sleeve 148.

A first outer sleeve first end 150 and bushing shaft first end 152 face the second side surface 140 of the main support beam 132. The first outer sleeve 146 is welded to the main support beam and covers a first sleeve portion of the bushing shaft 142, leaving exposed a second sleeve portion 156 of the bushing shaft. The first outer sleeve 146 and bushing shaft 142 are held in place by mounting bolts 158 which pass through aligned bores 159 that perforate the first sleeve 146 and bushing shaft 142.

The second outer sleeve is rotatably mounted on the second sleeve portion 156 of the bushing shaft 142. The second sleeve 156 connects the conveyor assembly 12 to the pivot means 16. This connection is facilitated by a sleeve bore 160 that passes through the conveyor assembly support beam 56, midway between the support beam ends 66,68. The second sleeve 148 is centered within the sleeve bore 160 and welded therein. The second outer sleeve 148 is sandwiched between the first outer sleeve second end 162 and an end plug 164 secured to the free end of the bushing shaft. As a result, the end plug 164 and first sleeve 146 cooperate, like bookends, to restrict longitudinal motion of the second sleeve 148, still allowing the second sleeve and conveyor assembly to rotate freely about the central axis of the bushing shaft 142.

A pair of cantilevered support arms 166,168 also extends from the main support beam first side 138. Each arm 166,168 is shaped to cradle the conveyor assembly support beam 56 when the conveyor assembly 12 is in a horizontal orientation. The first support arm 166 is located between main support beam first end 134 and the pivot means bushing shaft 142.

The second support arm 168 unit is located between the main support beam second end 136 and the pivot means bushing shaft 142. The second support arm unit 168 is a multi-part structure. It includes a fixed portion 170 disposed on the main support beam 132 and a breakaway portion 172 extending orthogonally from the second side surface 64 of the conveyor assembly support beam 56. The fixed and breakaway portions 170,172 line up and overlap to form a contiguous beam when the conveyor assembly is in its horizontal, storage position. A clasp 174 on the fixed portion 170 releasably secures an engagement tab 176 disposed on the breakaway portion 172, compressing the breakaway portion against the fixed portion and preventing relative motion within the second support arm unit. Once the fixed and breakaway portions 170,172 are clasped together, the second support arm unit maintains the conveyor assembly in a horizontal, storage orientation. To load or unload a vehicle, the clasp 174 is released.

One embodiment of the device includes a mounting means for coupling the device to a receiver-type hitch mounted on a transporting vehicle. As shown in FIG. 9, the mounting means includes a series of posts 180 that extend orthogonally from the second side 140 of the main support beam. The posts are sized and positioned to fit within reception apertures (not shown) commonly-associated with receiver-type hitches. Although the present embodiment includes three insertion posts, any number may be used, as dictated by the hitch on which the device will be mounted. By including more than one mounting post, however, the device 10 is better able to withstand torsion loads applied to the mounting means during loading and unloading.

To help meet the automatic-loading object of this invention, the device 10 includes a locomotion means 18 to move a secured vehicle 89 from a loading position to a storage position. The locomotion means 18 also moves the secured vehicle 89 back into an unloading position. As shown in FIG. 9, the locomotion means 18 includes a motorized winch 182 mounted on the first end of the conveyor assembly support beam. An idler pulley 184 is mounted on a idler pulley support arm 185 which extends from the first support arm 166. A cable support pulley 186 is rollably mounted on the pulley mounting beam 52 that extends between the L-sectioned beam first ends 50,50'. A second idler pulley 187 is mounted on the front of the docking unit 14. A driving cable 188 extends from the winch 182, over the pulleys 184,186,187 to an attachment eyelet 190 disposed on the conveyor assembly 12. The winch 182 and cable 188 translate the docking unit with respect to the conveyor assembly 18 and rotate the conveyor assembly 12 between horizontal and inclined orientations. Although a preferred pulley-and-winch configuration is described above, the configuration may be adjusted to accommodate secondary vehicles 89 of various size and weight.

Because the device 10 is designed to transport, not just support, a vehicle 89, the device includes a locking means 24 to secure the conveyor assembly 12 and docking unit 14, preventing unwanted motion during travel. Referring to FIG. 1, the locking means 24 includes a pair of horizontally-disposed positioning plates 192 that have centrally-disposed positioning cutouts 194. The positioning cutouts 194 fit into the docking unit U-sectioned channel 90, engaging the positioning notches 196 that are cut into top edges of the docking unit upstanding sidewalls. Lowering the positioning cutouts 194 into the positioning notches 196 ensures correct longitudinal positioning of the positioning plates 192, along the length of the U-sectioned channel 90. The first end 198 of each positioning plate 192 is bolted to an upper housing arch 200 centrally located on the top of the main support beam 132. The second end 202 of each positioning plate 192 is pinned to the first end 204 of an adjustable-length prop arm 206. The second end 208 of the prop arm 206 is pinned to a lower housing arch 210 disposed on the pivot means end plug 164. The prop arm 206 also includes a turnbuckle 212 to change the prop arm length. Proper adjustment of the prop arm 206 ensures that the positioning plates are properly seated within the U-sectioned channel 90. Once in place, the locking means 24 works with the driving cable 188 to prevent unwanted shifting of the docking unit 14 and conveyor assembly 12. The positioning plates 192 also include tiedown eyelets 130 for additional bracing of the vehicle 89 loaded within the docking unit 14.

Figure 16:
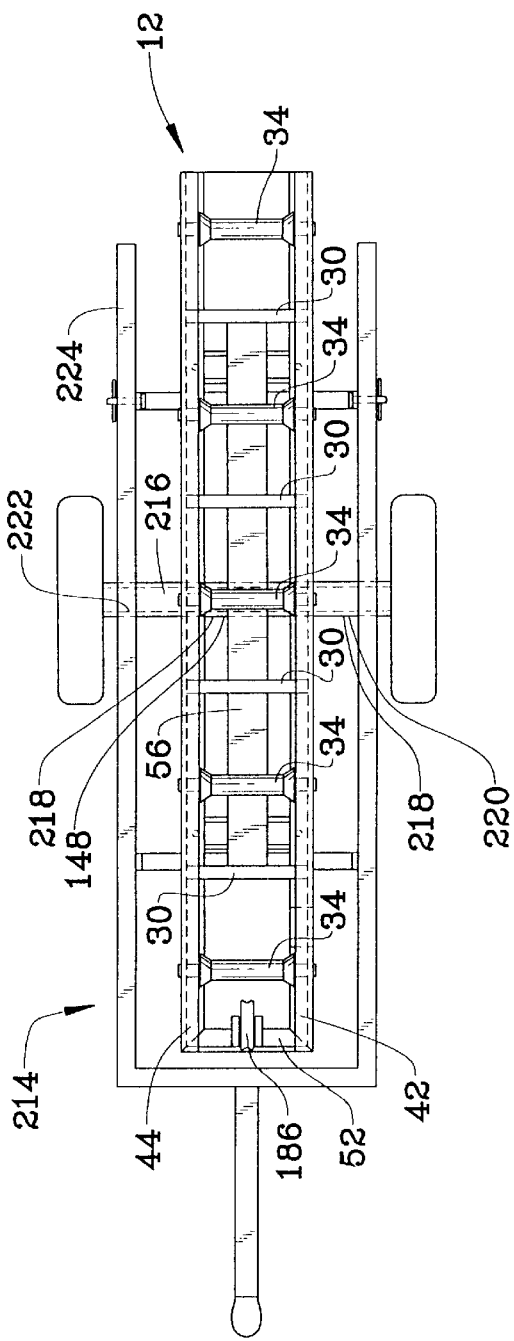
FIG. 16 is an overhead view of the present invention mounted on a trailer.
Figure 17:
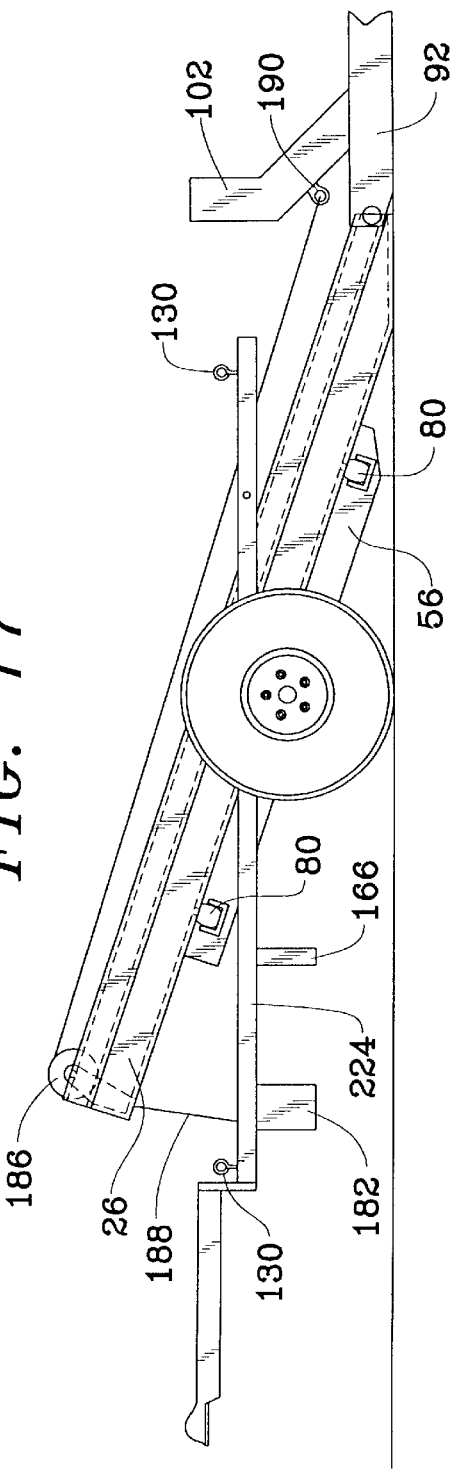
FIG. 17 is a side view of the present invention prepared for loading onto a trailer.

As shown in FIGS. 16 and 17, the device 10 may alternately be mounted on a trailer 214 that is towed behind the primary, transporting vehicle 22. For use on a trailer 214, the first outer sleeve 146 is omitted, and the second outer sleeve 148 is pivotally mounted on a bracket shaft 216 that extends between bracket plates 218 welded to the axle housing 220 which surrounds a trailer axle. As such, the bracket shaft 216 replaces the bushing shaft 142. Similarly, trailer support beams 224 are used instead of the main support beam 132 present in the hitch-mounted embodiment of the device 10. The second support arm unit 168 is replaced by a removable stop bracket 226 that extends between the trailer first beam and a trailer second beam; the removable stop bracket is pinned in place when the conveyor assembly 12 is horizontally oriented.

It is to be understood that while we have illustrated and described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A carrier for transporting a secondary vehicle with a primary vehicle, said carrier comprising:

a mounting assembly means for rigidly securing the carrier to a primary vehicle;

a conveyor assembly secured to said mounting means, said conveyor assembly having a friction reducing support surface;

a docking unit for wheeled support of said secondary vehicle, said docking unit having a wheel support surface defined by a width, a length, and two opposing sidewalls, said wheel support surface operatively associated with said friction reducing support surface of said conveyor assembly;

means for pivoting said conveyor assembly in relation to said mounting means;

control means for moving said docking unit along a longitudinal length of said conveyor assembly;

a locking means for securing said docking unit to said mounting assembly means;

at least one tie down-support means secured to said docking unit, said tie down-support having at least one tie down eyelet extending therefrom;

at least one stabilizing arm extending from said wheel support surface, said stabilizing arm having a least one tie down eyelet extending therefrom; and at least one wheel stop means slidably engaged with said wheel support surface;

whereby said conveyor assembly is pivoted allowing said docking unit to be placed on the ground allowing for the positioning of a secondary vehicle thereon, wherein said conveyor assembly provides for retraction of said docking unit for placing said secondary vehicle into a raised position permitting lockable securement for use during transporting.

2. The carrier according to claim 1 wherein said conveyor assembly is formed from a rigid support beam having a plurality of rotatable shafts extending between a first and second side support of said beam, and a means for guiding said docking unit along said rotatable shafts.

3. The carrier according to claim 1, wherein said docking unit is formed from a U-sectioned channel having a plurality of rollers disposed on a first end of said channel, said rollers oriented to engage a guide of said conveyor assembly.

4. The carrier according to claim 1, wherein said docking unit includes:

a U-sectioned channel having a first end spaced apart from a second end by a support floor, said support floor being bounded by said opposing sidewalls;

a plurality of docking unit travel rollers disposed on said U-sectioned channel, each of said docking unit travel rollers sized and oriented to roll within said conveyor assembly;

a first vehicle wheel stop attached to said first end of said U-sectioned channel;

a tie down-support bar disposed on said first vehicle wheel stop, said first tie down support including at least one tie down eyelet extending therefrom;

a stabilizing arm extending from each of said U-sectioned channel opposing sidewalls;

an arm wheel disposed on each of said stabilizing arms; and a second vehicle wheel stop slidably engaged with said U-sectioned channel second end.

5. The carrier according to claim 1, wherein said conveyor assembly is pivotally secured to said mounting means by a bushing shaft extending therebetween, said bushing shaft providing pivotal rotation of said conveyor assembly from a horizontal position, said conveyor assembly having a breakaway portion extending from a side surface thereof, said breakaway portion having an engagement tab extending therefrom.

6. The carrier according to claim 1, wherein said control means is a winch assembly disposed on a first end of said conveyor assembly, said winch assembly having a cable secured to said docking unit providing a positioning control of said docking unit to said conveyor assembly.

7. The carrier according to claim 1, wherein said mounting assembly means includes a plurality of insertion plugs extending orthogonally from a side surface of a main support beam, each of said insertion plugs sized and positioned to engage a corresponding receiver-type mounting hitch aperture.

8. The carrier according to claim 1 wherein said locking means includes a plurality of positioning notches placed along said sidewalls of said docking assembly; a plurality of positioning plates placed in said conveyor assembly sized to engage said positioning notches, said positioning plates each having a first end removably pinned to an upper linkage housing; an adjustable-length wedge arm having a first end pinned to said first end of said positioning plates, and a second end removably pinned to a lower linkage housing; and at least one tie down eyelet disposed on said positioning plates.

9. The carrier according to claim 1, wherein said conveyor assembly includes:

a support beam having an upper surface, a first side surface, and a second side surface;

a first elongated L-sectioned beam spaced apart from a second L-sectioned beam by a plurality of brace beams extending therebetween;

a plurality of center shafts extending orthogonally between said first and second L-shaped beams, each of said center shafts having a docking unit support roller rotatably disposed thereupon;

a first docking unit guide disposed along an upper edge of said first L-sectioned beam;

a second docking unit guide disposed along an upper edge of said second L-shaped beam, said first and second docking unit guides being C-sectioned beams having open portions which face each other; and a pulley mounting beam extending between a first end of said first L-sectioned beam and a corresponding first end of said second L-shaped beam.

10. A carrier for transporting a secondary vehicle with a primary vehicle, said carrier comprising:

a mounting assembly means for rigidly securing the carrier to a trailer hitch of a primary vehicle, said mounting assembly including a plurality of insertion plugs extending orthogonally from a side surface of a main support beam, each of said insertion plugs sized and positioned to engage a corresponding receiver-type mounting hitch aperture;

a conveyor assembly secured to said mounting means, said conveyor assembly having a friction reducing support surface;

a docking unit for wheeled support of said secondary vehicle, said docking unit having a wheel support surface defined by a width, a length, and two opposing sidewalls, said wheel support surface operatively associated with said friction reducing support surface of said conveyor assembly, said docking unit formed from a U-sectioned channel having rollers oriented to engage a guide of said conveyor assembly, and wheels for ease of movement of said channel on the ground;

means for pivoting said conveyor assembly in relation to said mounting means;

control means for moving said docking unit along a longitudinal length of said conveyor assembly; and a locking means for securing said docking unit to said mounting assembly means;

whereby said conveyor assembly is pivoted allowing said docking unit to be placed on the ground allowing for the positioning of a secondary vehicle thereon, wherein said conveyor assembly provides for retraction of said docking unit for placing said secondary vehicle into a raised position permitting lockable securement for use during transporting.

11. The carrier according to claim 10, wherein said locking means includes a plurality of positioning notches placed along said sidewalls of said docking assembly; a plurality of positioning plates placed in said conveyor assembly sized to engage said positioning notches, said positioning plates each having a first end removably pinned to an upper linkage housing; an adjustable-length wedge arm having a first end pinned to said first end of said positioning plates, and a second end removably pinned to a lower linkage housing; and at least one tie down eyelet disposed on said positioning plates.

12. The carrier according to claim 10, wherein said conveyor assembly includes:

a support beam having an upper surface, a first side surface, and a second side surface;

a first elongated L-sectioned beam spaced apart from a second L-sectioned beam by a plurality of brace beams extending therebetween;

a plurality of center shafts extending orthogonally between said first and second L-shaped beams, each of said center shafts having a docking unit support roller rotatably disposed thereupon;

a first docking unit guide disposed along an upper edge of said first L-sectioned beam;

a second docking unit guide disposed along an upper edge of said second L-shaped beam, said first and second docking unit guides being C-sectioned beams having open portions which face each other; and a pulley mounting beam extending between a first end of said first L-sectioned beam and a corresponding first end of said second L-shaped beam.

13. The carrier according to claim 10, wherein said docking unit includes:
   a U-sectioned channel having a first end spaced apart from a second end by a support floor, said support floor being bounded by said opposing sidewalls;
   a plurality of docking unit travel rollers disposed on said first end of said U-sectioned channel, each of said docking unit travel rollers sized and oriented to roll within said conveyor assembly;
   a first vehicle wheel stop attached to said first end of said U-sectioned channel;
   a tie down-support bar disposed on said first vehicle wheel stop, said first tie down support including at least one tie down eyelet extending therefrom;
   a stabilizing arm extending from each of said U-sectioned channel opposing sidewalls;
   an arm wheel disposed on each of said stabilizing arms; and
   a second vehicle wheel stop slidably engaged with said U-sectioned channel second end.

14. The carrier according to claim 10 including at least one tie down-support means secured to said docking unit, said tie down-support having at least one tie down eyelet extending therefrom; at least one stabilizing arm extending from said wheel support surface, said stabilizing arm having a least one tie down eyelet extending therefrom; and at least one wheel stop means slidably engaged with said wheel support surface.

15. The carrier according to claim 10, wherein said conveyor assembly is pivotally secured to said mounting means by a bushing shaft extending therebetween, said bushing shaft providing pivotal rotation of said conveyor assembly from a horizontal position, said conveyor assembly having a breakaway portion extending from a side surface thereof, said breakaway portion having an engagement tab extending therefrom.

16. The carrier according to claim 10, wherein said control means is a winch assembly disposed on a first end of said conveyor assembly, said winch assembly having a cable secured to said docking unit providing a positioning control of said docking unit to said conveyor assembly.

17. A carrier for transporting a secondary vehicle with a primary vehicle, said carrier comprising:
   a mounting assembly means for rigidly securing the carrier to a trailer which is secured to a trailer hitch of a primary vehicle;
   a conveyor assembly secured to said mounting means, said conveyor assembly having a friction reducing support surface;
   a docking unit for wheeled support of said secondary vehicle, said docking unit having a wheel support surface defined by a width, a length, and two opposing sidewalls, said wheel support surface operatively associated with said friction reducing support surface of said conveyor assembly, said docking unit formed from a U-sectioned channel having rollers oriented to engage a guide of said conveyor assembly, and wheels for ease of movement of said channel on the ground;
   means for pivoting said conveyor assembly in relation to said mounting means;
   a control means for moving said docking unit along a longitudinal length of said conveyor assembly;
   at least one tie down-support means secured to said docking unit, said tie down-support having at least one tie down eyelet extending therefrom;
   at least one stabilizing arm extending from said wheel support surface, said stabilizing arm having a least one tie down eyelet extending therefrom; and
   at least one wheel stop means slidably engaged with said wheel support surface,
   whereby said conveyor assembly is pivoted allowing said docking unit to be placed on the ground allowing for the positioning of a secondary vehicle thereon, wherein said conveyor assembly provides for retraction of said docking unit for placing said secondary vehicle into a raised position permitting lockable securement for use during transporting.

18. The carrier according to claim 17, wherein said conveyor assembly is pivotally secured to said mounting means by a bushing shaft extending therebetween, said bushing shaft providing pivotal rotation of said conveyor assembly from a horizontal position, said conveyor assembly having a breakaway portion extending from a side surface thereof, said breakaway portion having an engagement tab extending therefrom.

19. The carrier according to claim 17, wherein said control means is a winch assembly operatively associated with a first end of said conveyor assembly, said winch assembly having a cable secured to said docking unit providing a positioning control of said docking unit to said conveyor assembly.

20. The carrier according to claim 17, wherein said mounting means includes:
   a bracket shaft extending through a conveyor assembly support beam; and
   a plurality of bracket plates extending upward from said trailer, said bracket plates shaped to engage said bracket shaft;
   wherein said carrier is for selectively attaching a secondary vehicle to a trailer that is tethered to a ball-type hitch disposed on a rear of a primary vehicle.

21. The carrier according to claim 17, wherein said conveyor assembly includes:
   a support beam having an upper surface, a first side surface, and a second side surface;
   a first elongated L-sectioned beam spaced apart from a second L-sectioned beam by a plurality of brace beams extending therebetween;
   a plurality of center shafts extending orthogonally between said first and second L-shaped beams, each of said center shafts having a docking unit support roller rotatably disposed thereupon;
   a first docking unit guide disposed along an upper edge of said first L-sectioned beam;
   a second docking unit guide disposed along an upper edge of said second L-shaped beam, said first and second docking unit guides being C-sectioned beams having open portions which face each other; and
   a pulley mounting beam extending between a first end of said first L-sectioned beam and a corresponding first end of said second L-shaped beam.

22. The carrier according to claim 17, wherein said docking unit includes:
   a U-sectioned channel having a first end spaced apart from a second end by a support floor, said support floor being bounded by said opposing sidewalls;
   a plurality of docking unit travel rollers disposed on said U-sectioned channel, each of said docking unit travel rollers sized and oriented to roll within said conveyor assembly;

a first vehicle wheel stop attached to said first end of said U-sectioned channel;

a tie down-support bar disposed on said first vehicle wheel stop, said first tie down support including at least one tie down eyelet extending therefrom;

a stabilizing arm extending from each of said U-sectioned channel opposing sidewalls;

an arm wheel disposed on each of said stabilizing arms; and a second vehicle wheel stop slidably engaged with said U-sectioned channel second end.

* * * * *